United States Patent [19]

Placek

[11] Patent Number: 5,128,067
[45] Date of Patent: Jul. 7, 1992

[54] FIRE RESISTANT LOW TEMPERATURE GREASE

[75] Inventor: Douglas G. Placek, Fairless Hills, Pa.

[73] Assignee: FMC Corporation, Philadelphia, Pa.

[21] Appl. No.: 810,042

[22] Filed: Dec. 19, 1991

[51] Int. Cl.$^5$ .................. C09K 21/00; C10M 0/00
[52] U.S. Cl. ........................... 252/602; 252/11;
 252/27; 252/28; 252/32.5; 252/49.8
[58] Field of Search ............ 252/602, 11, 27, 28, 252/49.8, 32.5

[56] References Cited

U.S. PATENT DOCUMENTS

| | | | |
|---|---|---|---|
| 4,318,817 | 3/1982 | Huebner | 252/78.5 |
| 4,357,458 | 11/1982 | Antkowiak | 528/167 |
| 4,490,266 | 12/1984 | Hentschel et al. | 252/49.8 |
| 4,770,670 | 9/1988 | Hazbun | 44/301 |
| 4,879,054 | 11/1989 | Waynick | 252/41 |
| 4,898,683 | 2/1990 | DeKura | 252/51 |
| 5,023,312 | 6/1991 | Erickson et al. | 558/160 |

Primary Examiner—Richard D. Lovering
Assistant Examiner—N. Bhat
Attorney, Agent, or Firm—R. E. Elden; F. Ianno; R. L. Andersen

[57] ABSTRACT

A flame retardant grease composition is described for low temperature applications comprising mixed alkoxy and alkylated phenyl triesters of a phosphorus oxyacid as a base fluid and a siliceous microparticulate inorganic thickener. The grease has excellent low, medium and high temperature physical properties, which makes it suitable for service in applications with wide temperature (−40° C. to +150° C.) fluctuations. The benefits of reduced rolling resistance can be realized in significant energy savings and the possibility of constructing longer conveyor lines with existing drive motors.

10 Claims, No Drawings

FIRE RESISTANT LOW TEMPERATURE GREASE

This invention relates to a fire resistant grease which is usable even at subzero temperatures.

There is a need for a fire resistant grease particularly one usable in subzero temperatures for lubricating bearings and other moving surfaces in mines but such greases may be useful in any other areas where fire is a hazard. Ordinary mineral lubricating base oils can obviously not be used for such greases. A convenient starting point for fire-resistant greases according to U.S. Pat. No. 4,206,061 is the use of fire resistant hydraulic fluids as base oils, such as phosphorus acid esters or amides and more particularly trihydrocarbyl phosphates thickened with graphitic carbon. However, even with graphitic carbon as the thickener the viscosity of the base oil at subzero temperatures is unacceptable and too great to be practical. Furthermore, U.S. Pat. No. 4,490,266 discloses that phosphate esters have an extremely poor viscosity-temperature behavior in the temperature range of $-20°$ C. to $+150°$ C., even though they present no corrosion problems and do not cause high wear at highly loaded points of friction. The patent discloses that when thickened with known polyacrylate and polyolefin viscosity modifiers the phosphate esters suffer a loss of effectiveness at high shear rates.

Instead, U.S. Pat. No. 4,490,266 teaches incorporating a polyester having a weight average molecular weight of 20,000 to 300,000 into an aromatic phosphate ester such as tricresyl phosphate, dicresyl monophenyl phosphate, monocresyl diphenyl phosphate and other phosphate esters of monophenols, thereby improving the viscosity index measured between the temperatures of 38.7° C. and 98.9° C., thereby making the esters suitable for use as a liquid hydraulic fluid.

U.S. Pat. No. 4,879,054 discloses that many mechanisms such as bearings, actuator screws, guages, instruments, aircraft, vehicles, tanks, and other military equipment are required to perform well at ultra low temperatures, such as at $-73°$ C. Lubricating greases for such mechanisms, therefore, not only must perform well at low temperatures but also such lubricating greases must have outstanding oxidation resistance, good antiwear properties, superior pliability, and excellent stability at normal, as well as low temperatures. U.S. Pat. No. 4,879,054 teaches a process for manufacturing low temperature greases employing a dialkyl ester of a dicarboxylic acid thickened with a lithium soap. However, such an extreme low temperature grease is flammable.

The present invention overcomes the deficiencies of the prior art by providing a fire resistant grease composition comprising:

a) between 85 and 95 parts by weight of a base fluid comprising mixed alkyoxy and phenyl triesters of phosphorus oxyacids, wherein the mole ratio of esterified phenyl groups to esterified alkoxy groups ranges from 7:1 to 0.7:1, and wherein each esterified phenyl group is either phenol, or a mono- or polyalkylated phenol, the alkylating moieties thereof each containing from 1 to 5 carbon atoms, and each esterified alkoxy group contains between 3 and 10 carbon atoms thereby providing a fire resistant grease base fluid with a single phase, a flash point of at least 200° C. and a pour point of less than $-40°$ C., and b) between 5 and 15 parts by weight of a siliceous microparticulate inorganic thickener selected from the group consisting of clay and silica, thereby providing a fire resistant grease composition with low viscosity at subzero temperatures. For the purpose of this invention a phenyl phosphate ester and an alkylated phenyl phosphate ester collectively are referred to as aryl phosphates.

It is critical that the base fluid be a liquid with a pour point of less than $-50°$ C., and preferably to have a pour point of less than $-65°$ C. if the grease is to be used at temperatures of less than $-35°$ C. The base fluid must not separate into two phases within the desired operating range. The mixed phosphorus triesters can be a mixture of two or more phosphate or phosphite esters, such as triaryl phosphate, triaryl phosphite, diaryl monoalkoxy phosphate, trialkoxy phosphite, monoaryl dialkoxy phosphate and trialkoxy phosphate. When a trialkoxy phosphite is incorporated into the base fluid it is often necessary to incorporate sufficient trialkoxy phosphate to prevent the formation of a second liquid phase at the lower temperatures. To illustrate the invention it is easiest to describe the base fluid in terms of mixtures of a triaryl phosphate and a trialkoxy phosphate. It is particularly desirable for the triaryl phosphorus esters to be mixtures of differently alkylated phenyl groups such as produced by the process of U.S. Pat. No. 3,576,923 in which phenol, a C1 to C4 alkylated phenol or mixture is reacted with sufficient alkylating agent in the presence of a Lewis acid catalyst or a Bronstead acid catalyst to produce an alkylated phenol wherein the mole ratio of the added alkylating moiety to phenol moiety ranges from 0.005 to about 0.65 and the number of carbon atoms per each alkylating moiety ranges from 3 to 5.

The alkylated phenol may then be reacted with a phosphorylating agent, such as phosphorus oxychloride, optionally after adding to the alkylated phenol other alkylated phenols, such as cresol and the like. The crude triaryl phosphate is subsequently purified by conventional treatment including distillation, caustic washing, adsorption and the like to produce a tri(alkylated phenyl)phosphate ester (triaryl phosphate).

Such "synthetic" triaryl phosphate esters are readily available commercially. For example, one sample of a product trademarked Durad 220B by FMC Corporation on analysis contained about 17% triphenyl phosphate, 43.4% butylphenyl diphenyl phosphate, 30.1% bis(butylphenyl)phenyl phosphate and 5.4% tris(butylphenyl)phosphate and had an average molecular weight of 423. The commercial product usually contains about 7.9% phosphorus and has an average molecular weight of 392.

The base fluid could contain either a single esterified alkoxy group or a mixture of different esterified alkoxy groups. It is most convenient to supply the esterified alkoxy groups as commercial triesters of a phosphorus oxyacid, such as tributyl phosphate, trioctyl phosphite, tributoxyethyl phosphate, trioctyl phosphate, and the like. These are also commercially available.

For the purpose of this invention a triester of a phosphorus oxyacid is a compound with a formula $(RO)_3P(O)_n$ wherein each R may be the same or different alkoxy or aryl group and n may be 1 or 0.

The viscosity at low temperatures can be varied by adjusting the mole ratio of esterified aryl groups to esterified alkoxy groups in the phosphorus ester base fluid. As the mole ratio of aryl groups to alkoxy groups decreases, the pour point decreases and the viscosity of the base fluid decreases. Desirable base fluid compositions for low temperature use includes aryl to alkyl mole ratios of 7:1 to 0.7:1, 7:1 to 1:1 for the higher temperatures and for the lower temperatures a mole ratio should be between 4:1 to 0.7:1 and preferably for very low temperatures between 2:1 and 0.7:1.

To assure fire resistance, the thickener for the grease desirably should be non-flammable, such as an inorganic siliceous material. However, flammable thickeners could be used in small quantities. Suitable non-flammable thickeners are well known in the art and include microparticular clays, such as bentonite and hectorite and other types of clays that are typically used in greases as well as microparticular amorphous silica, preferably fumed silica, such as CAB-O-SIL ® fumed silica (trademark Cabot Corp.).

The type and amount of thickener employed will vary with the specific application to obtain the desired quantities. One skilled in the art can easily select the preferred thickener and optimum proportions of base fluid and thickener to meet the specific application without undue experimentation. For example, the Cabot Corp. brochure "CAB-O-SIL Fumed Silica Properties and Functions," provides comparative information on the thickening of various liquids with fumed silica.

The scope of this invention is intended to include other usual additives for a base fluid or a grease, such as stabilizers, antioxidants, rust inhibitors, corrosion inhibitors, and the like.

For the purpose of describing this invention, it is important to avoid confusing terminology. The term "alkylating moiety" is used herein for an alkyl radical attached to an aromatic ring by a carbon-carbon bond; the term "alkoxy group" is used herein for an esterified alkyl radical attached by an oxygen to a phosphorus atom; and "aryl group" is used herein for an esterified phenol or alkylated phenol attached as an ester to a phosphorus atom.

A more detailed explanation of the invention is provided in the following examples which are presented as illustrations and not as limitations.

EXAMPLES

The properties of the grease were measured by the following test procedures:

A modified oxygen index (OI) test was performed on a 1.5 gram sample of grease (20 mm in diameter × 10 mm high) that was subjected to a direct propane flame for 5 seconds. The OI was recorded as the minimum percentage of oxygen in an oxygen/nitrogen environment required for the grease to ignite and sustain combustion. This test is a modification of ASTM D-2863.

The vertical burn test evaluates the grease's ability to resist combustion in a standard air environment when subjected to a direct flame for 30 seconds. A grease was spread 1 mm thick evenly over a 2.54×12.7 cm steel mesh strip. The strip was suspended vertically, and a 1 inch propane flame was held at the base. The grease was observed for ignition. This test is a modification of ASTM D-3801.

The initial start-up and rolling resistance torques were measured and recorded before and after the four hours "Burn In" time at ambient (approximately 65° F.) on each roller. The resistance was measured by rotation of the inner shaft of the roller with a strainguaged and calibrated shaft and slip ring assembly, while holding the outer roller stationary. The power was provided with a variable drive electric motor and right angle gearbox which was pre-set to 330 RPM.

The sub-zero (−40° C.) temperature tests were conducted with the rollers (one at a time) placed in an environmental chamber while accessing the shaft through a hole in the side of the chamber. The rollers were allowed to soak at −40° C. for a minimum of 24 hours prior to each test.

A variety of grease candidates were prepared based upon the following composition guidelines:

Isopropylphenyl phosphate (IPP) or t-butylphenyl phosphate (TBPP) at 50–90 wt. %

Tributyl phosphate and/or tributoxyethyl phosphate and/or trioctyl phosphate and/or tri-isooctyl phosphite at 10–50 wt. %

Fumed silica thickener at 5–15 wt. %. CAB-O-SIL ® M-5 (Cabot Corp. trademark) was employed as it is intermediate between L-90 and EH-5 grades in surface area Rust and oxidation inhibitors may also be added at 0.01–3.0 wt. %.

The t-butylphenyl phosphate (TBPP) used contained on the average 0.20 to 0.25 t-butyl moieties per phenyl group. The additive containing about 8.7% by weight phosphorus (average molecular weight 356). The isopropylphenyl phosphate (IPP) was FMC Corporation's Kronitex K-25 isopropylated triaryl phosphate which typically contains about 0.2 to 0.25 isopropyl moieties per phenol group resulting an average molecular weight of about 360 (8.61% by weight phosphorus).

The compositions were prepared containing the following phosphate and phosphite esters and suitable additives as shown in Tables I–V.

EXAMPLE 1

IPP-73.99 parts by weight; tributyl phosphate 23.99 parts by weight (MW 266) to produce an aryl:alkyl group mole ratio of 2.28.

EXAMPLE 2

IPP-70.99 parts; tributyl phosphate 26.99 parts; aryl alkyl mole ratio 1.94.

EXAMPLE 3

IPP-68.94 parts; tri-butoxyethyl phosphate (FMC's KP-140) 28.99 parts (MW 398); aryl:alkyl mole ratio 2.62.

EXAMPLE 4

TBPP-68.99 parts; tributyl phosphate 28.99 parts; aryl:alkyl mole ratio 1.77.

EXAMPLE 5

IPP-72.99 parts; tributyl phosphate 16.99 parts (MW 434) trioctyl phosphate 8.0 parts; alkyl:aryl ratio 3.15.

The properties of the base fluids and greases thickened with CAB-O-SIL M5 brand fumed silica are disclosed in Tables I to V.

The additive package can be designed to enhance the oxidative and hydrolytic stability of the base fluid, and also to protect copper and steel system components from rust or corrosion.

Fumed silica was selected as an optimum thickener for the formulated phosphate ester base fluid. Silicon dioxide can be mixed in without heating or chemical reaction, it precludes the need to manufacture an organic soap thickener, and it does not contribute to the flammability of the final product.

Five different base fluid mixtures were prepared. Their formulations and performance attributes are presented as Examples 1 to 5 in Tables I to V. Table VI compares the five examples with commercial greases. From Table VI it is clear that the inventive compositions all have superior low temperature start up and rolling torque and resistance to burning as compared with the commercial compositions.

EXAMPLE 6

Base fluid compositions were prepared using a commercial tri-isooctyl phosphite and tri(alkylated phenyl)-phosphate. On cooling two phases formed which did not form a satisfactory grease on incorporating a thickener.

Subsequently, single phase base fluids were formed as follows: Sample A by incorporating, by weight 54 parts TBPP, 23 parts tri-isooctyl phosphate and 23 parts tributyl phosphate (ratio 1.3:1); and Sample B by incorporating 58 parts IPP, 25 parts tri-isooctyl phosphite and 17 parts tributyl phosphate (ratio 0.86:1). Sample A base fluid had a viscosity of 7.9 cSt at 100° C. before the standard additive package was added as in Examples 1-5 and 8.9 cSt after; Sample B base fluid viscosity was 8.4 and 9.4 respectively. Both samples had pour points of −57° C. and remained single phase liquids. Both samples formed satisfactory greases containing 11% fumed silica solids.

TABLE I

| Example 1 | |
|---|---|
| | Weight % |
| Base Fluid | |
| Isopropylphenyl phosphate | 73.99 |
| Tributyl phosphate | 23.99 |
| Epoxy resin stabilizer | 1.0 |
| Amine antioxidant | 1.0 |
| Acid phosphate rust inhibitor | 0.01 |
| Benzotriazole corrosion inhibitor | 0.01 |
| Base Fluid Properties | |
| Viscosity, cSt @ 98.9° C. | 2.8 |
| cSt @ 37.8° C. | 10.4 |
| cSt @ −40° C. | 4100 |
| Pour Point, °C. | −54 |
| ASTM D665 Rust Test | Pass, no rust |
| Grease Properties | |
| Thickener | Fumed Silica, 13 wt. % |
| Worked Penetration @ 25° C. | 280 |
| 4-ball wear scar, mm, ASTM D2266 | 0.63 |
| Specific Gravity 20°/20° C. | 1.181 |
| Oxygen Index, ASTM D2863 mod. | 27.5 |
| Initial Start-up Torque @ 25° C. | 105 in-oz (.74 nm) |
| Rolling Resistance Torque @ 25° C. | 105 in-oz (.74 nm) |
| Initial Start-up Torque @ −40° C. | 400 in-oz (2.82 nm) |
| Rolling Resistance Torque @ −40° C. | 400 in-oz (2.82 nm) |

TABLE II

| Example 2 | |
|---|---|
| | Weight % |
| Base Fluid | |
| Isopropylphenyl phosphate | 70.99 |
| Tributyl phosphate | 26.99 |
| Epoxy resin stabilizer | 1.0 |
| Amine antioxidant | 1.0 |
| Acid phosphate rust inhibitor | 0.01 |
| Benzotriazole corrosion inhibitor | 0.01 |
| Base Fluid Properties | |
| Viscosity, cSt @ 98.9° C. | 2.4 |
| cSt @ 37.8° C. | 9.7 |
| cSt @ −40° C. | 3100 |

TABLE II-continued

| Example 2 | |
|---|---|
| | Weight % |
| Pour Point, °C. | −57 |
| ASTM D665 Rust Test | Pass, no rust |
| Grease Properties | |
| Thickener | Fumed Silica, 14 wt. % |
| Worked Penetration @ 25° C. | 280 |
| 4-ball wear scar, mm, ASTM D2266 | 0.63 |
| Specific Gravity 20°/20° C. | 1.185 |
| Oxygen Index, ASTM D2863 mod. | 27.3 |
| Initial Start-up Torque @ −40° C. | 300 in-oz (2.12 nm) |
| Rolling Resistance Torque @ −40° C. | 200 in-oz (1.41 nm) |

TABLE III

| Example 3 | |
|---|---|
| | Weight % |
| Base Fluid | |
| Isopropylphenyl phosphate | 68.99 |
| Tributoxyethyl phosphate | 28.99 |
| Epoxy resin stabilizer | 1.0 |
| Amine antioxidant | 1.0 |
| Acid phosphate rust inhibitor | 0.01 |
| Benzotriazole corrosion inhibitor | 0.01 |
| Base Fluid Properties | |
| Viscosity, cSt @ 98.9° C. | 3.1 |
| cSt @ 37.8° C. | 13.8 |
| cSt @ −40° C. | 6000 |
| Pour Point, °C. | −48 |
| ASTM D665 Rust Test | Pass, no rust |
| Grease Properties | |
| Thickener | Fumed Silica, 14 wt. % |
| Worked Penetration @ 25° C. | 280 |
| 4-ball wear scar, mm, ASTM D2266 | 0.70 |
| Specific Gravity 20°/20° C. | 1.090 |
| Oxygen Index, ASTM D2863 mod. | 28.5 |
| Initial Start-up Torque @ −40° C. | 450 in-oz (3.18 nm) |
| Rolling Resistance Torque @ −40° C. | 400 in-oz (2.82 nm) |

TABLE IV

| Example 4 | |
|---|---|
| | Weight % |
| Base Fluid | |
| t-butylphenyl phosphate | 68.99 |
| Tributyl phosphate | 28.99 |
| Epoxy resin stabilizer | 1.0 |
| Amine antioxidant | 1.0 |
| Acid phosphate rust inhibitor | 0.01 |
| Benzotriazole corrosion inhibitor | 0.01 |
| Base Fluid Properties | |
| Viscosity, cSt @ 98.9° C. | 2.6 |
| cSt @ 37.8° C. | 10.0 |
| cSt @ −40° C. | 3800 |
| Pour Point, °C. | −57 |
| ASTM D665 Rust Test | Pass, no rust |
| Grease Properties | |
| Thickener | Fumed Silica, 13 wt. % |
| Worked Penetration @ 25° C. | 280 |
| 4-ball wear scar, mm, ASTM D2266 | 0.62 |
| Specific Gravity 20°/20° C. | 1.20 |
| Oxygen Index, ASTM D2863 mod. | 27.3 |

TABLE V

| Example 5 | |
|---|---|
| | Weight % |
| Base Fluid | |
| Isopropylphenyl phosphate | 72.99 |
| Tributyl phosphate | 16.99 |
| Trioctyl phosphate | 8.0 |
| Epoxy resin stabilizer | 1.0 |
| Amine antioxidant | 1.0 |
| Acid phosphate rust inhibitor | 0.01 |

TABLE V-continued

Example 5

|  | Weight % |
|---|---|
| Benzotriazole corrosion inhibitor | 0.01 |
| Base Fluid Properties | |
| Viscosity, cSt @ 98.9° C. | 2.9 |
| cSt @ 37.8° C. | 10.5 |
| cSt @ −40° C. | 4600 |
| Pour Point, °C. | −51 |
| ASTM D665 Rust Test | Pass, no rust |
| Grease Properties | |
| Thickener | Fumed Silica, 13 wt. % |
| Worked Penetration @ 25° C. | 280 |
| 4-ball wear scar, mm, ASTM D2266 | 0.64 |
| Specific Gravity 20°/20° C. | 1.120 |
| Oxygen Index, ASTM D2863mod. | 28.0 |

TABLE VI

| | Grease Comparison Example # | | | | | Commercial Greases | | | |
|---|---|---|---|---|---|---|---|---|---|
| | 1 | 2 | 3 | 4 | 5 | 6 | 7 | 8 | 9 |
| Vertical Burn Ignition? | No | No | No | No | No | No | Yes | No | Yes |
| Modified Oxygen Index | 27.5 | 27.3 | 28.5 | 27.3 | 28.0 | 24.5 | | | |
| 4-ball Wear Scar, mm | 0.63 | 0.63 | 0.70 | 0.62 | 0.64 | 0.58 | >2.0 | 0.62 | 0.55 |
| Initial Start Torque at −40° C. nm | 2.82 | 2.12 | 3.18 | | | 13.62* | | 28.24* | 5.65 |
| Rolling Resistance nm | 2.82 | 1.41 | 2.82 | | | 5.65* | | | |

*undesirable properties.
Product Identification:
1- Example 1
2- Example 2
3- Example 3
4- Example 4
5- Example 5
6- Century Bentone FRLT, phosphate ester grease
7- BEL-RAY ® Silicone LH Grease
8- Shell U.K. FR Grease, phosphate ester grease
9- Unirex ® LoTemp EP, Lithium base, hydrocarbon oil, low temperature performance grease

I claim:

1. A fire resistant grease composition comprising:
   a) between 85 and 95 parts by weight of a base fluid having a single liquid phase comprising mixed alkoxy and phenyl triesters of a phosphorus oxyacid, wherein the mole ratio of esterified phenyl groups to esterified alkyl groups ranges from 7:1 to 0.7:1, and wherein each esterified phenyl group is either phenol, or a mono- or polyalkylated phenol, the alkylating moieties thereof each containing from 1 to 5 carbon atoms, and each esterified alkoxy group contains between 3 and 10 carbon atoms, thereby providing a fire resistant grease base fluid with a flash point of at least 200° C. and a pour point of less than −40° C., and
   b) between 5 and 15 parts by weight of a siliceous microparticulate inorganic thickener selected from the group consisting of clay and silica, thereby providing a fire resistant grease composition with low viscosity at subzero temperatures.

2. The composition of claim 1 wherein the microparticulate inorganic thickener is fumed silica.

3. The composition of claim 2 wherein the mole ratio of esterified aryl groups to esterified alkoxy groups ranges from 4:1 to 0.7:1 to provide a fire resistant grease composition with an initial start-up torque at −40° C. of less than 3.5 nm (500 in-oz.).

4. The composition of claim 3 wherein the mixed alkoxy and phenyl triester of a phosphorus oxyacid is a mixture of a trialkoxy phosphate and a tri(alkylated phenyl)phosphate, wherein the alkyl groups contain between 4 and 8 carbon atoms and the alkylated phenyl groups on the average contain from 0.2 to 0.6 alkyl moieties.

5. The composition of claim 2 wherein the mixed alkoxy and phenyl triester of a phosphorus oxyacid is a mixture of a trialkoxy phosphate and a tri(alkylated phenyl)phosphate, wherein the alkoxy groups contain between 4 and 8 carbon atoms and the alkylated phenyl groups on the average contain from 0.2 to 0.6 alkyl moieties.

6. The composition of claim 1 wherein the mole ratio of esterified phenyl groups to esterified alkoxy groups ranges from 4:1 to 0.7:1 to provide a fire resistant grease composition with an initial start-up torque at −40° C. of less than 500 in-oz.

7. The composition of claim 6 wherein the mixed alkoxy and phenyl phosphate triester is a mixture of a trialkoxy phosphate and a tri(alkylated phenyl)phosphate, wherein the alkoxy groups contain between 4 and 8 carbon atoms and the alkylated phenyl groups on the average contain from 0.2 to 0.6 alkyl moieties.

8. The composition of claim 1 wherein the mixed alkoxy and phenyl triester of a phosphorus oxyacid is a mixture of a trialkoxy phosphate and a tri(alkylated phenyl)phosphate, wherein the alkoxy groups contain between 4 and 8 carbon atoms and the phenyl groups on the average contain from 0.2 to 0.6 alkyl moieties.

9. The composition of claim 1 wherein the mixed alkoxy and phenyl triester of a phosphorus oxyacid is a single phase mixture of a trialkoxy phosphite and a trialkoxy phosphate with a tri(alkylated phenyl)phosphate, wherein the alkoxy groups contain between 4 and 8 carbon atoms and the alkylated phenyl groups on the average contain from 0.2 to 0.6 alkyl moieties.

10. A fire resistant grease composition comprising between about 85 and 95 parts by weight of a base fluid having a flash point of at least 200° C. and a pour point less than −40° C., the composition comprising a trialkoxy phosphate ester and a tri(alkylated phenyl)phosphate ester and between 5 and 15 parts by weight of a siliceous microparticulate inorganic thickener selected from the group consisting of clay and fumed silica, wherein each alkoxy group of the trialkoxy phosphate contains from 4 to 8 carbon atoms, and the alkylated phenyl groups contain on the average between 0.2 and 0.6 alkyl moieties, and wherein the mole ratio of esterified alkylated alkoxy groups to esterified alkylated phenyl groups is between 0.7:1 to 4:1.

* * * * *